April 7, 1953  W. L. SHEPPARD  2,633,712
SERVO CYLINDER
Filed Feb. 16, 1951
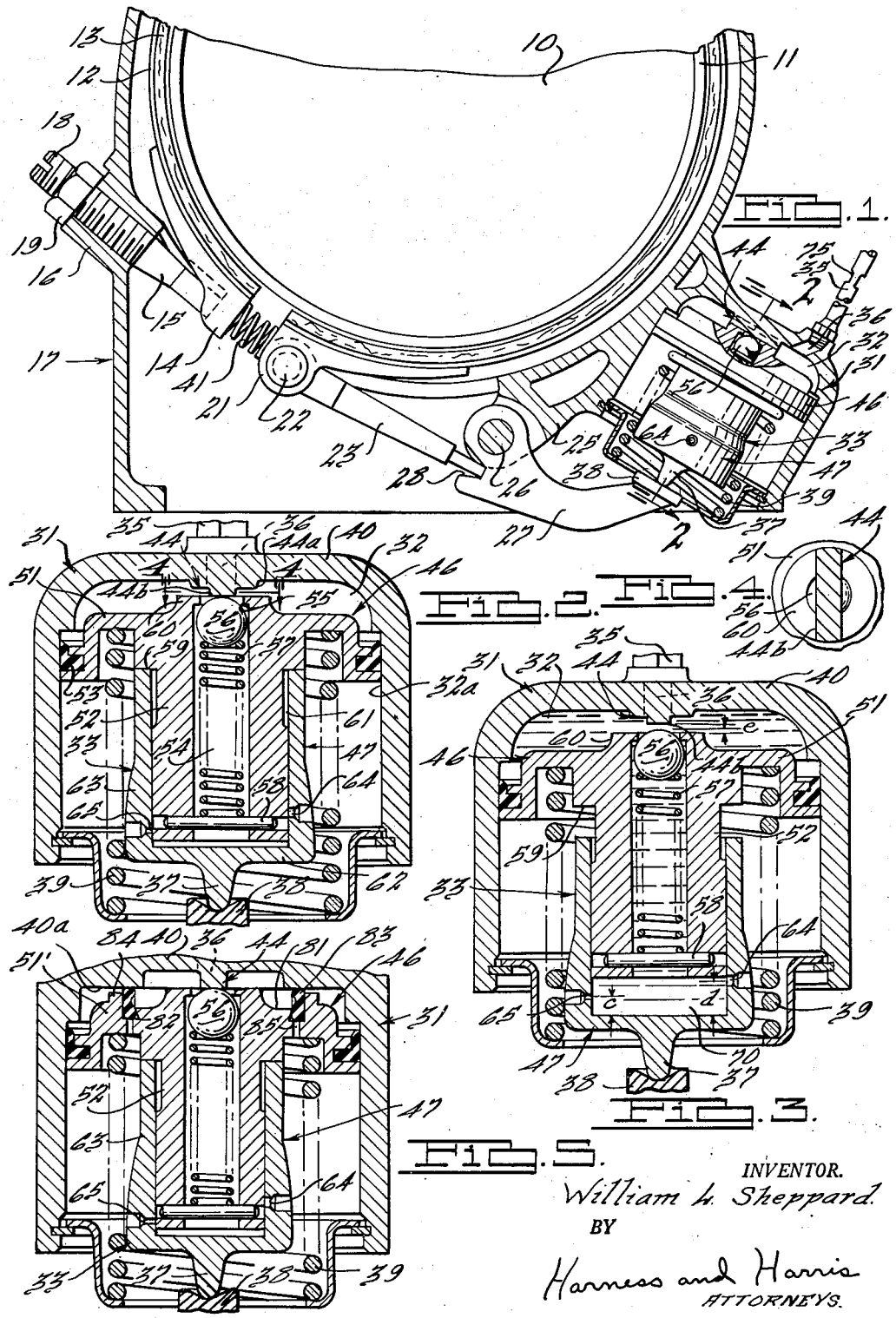
INVENTOR.
William L. Sheppard
BY
Harness and Harris
ATTORNEYS.

Patented Apr. 7, 1953

2,633,712

UNITED STATES PATENT OFFICE 2,633,712

SERVO CYLINDER

William L. Sheppard, Romulus, Mich., assignor to Chrysler Corporation, Highland Park, Mich., a corporation of Delaware Application February 16, 1951, Serial No. 211,300

13 Claims. (Cl. 60—97)

This invention relates to a fluid operated servo mechanism and is particularly concerned with control valving associated with the servo mechanism that is adapted to modify the action of the servo. The invention is shown applied to a band type clutch or brake or similar device operated by a servo mechanism wherein the associated valving provides an improved means for taking up slack in the band and also provides a novel means for cushioning the application of the brake or clutch band to its associated drum element.

A particularly advantageous application of the invention herein disclosed may be made in motor vehicle power transmission units that utilize hydraulically operated servo mechanisms to provide means for controlling the transmission of different speed ratio drives through the power transmission unit. While the above mentioned specific use of the invention disclosed is of primary concern, still, it is thought to be obvious that there are numerous other applications and thus there is no intention to limit this invention to the motor vehicle power transmission art.

It is a primary object of this invention to provide a fluid operated servo mechanism that includes a combination slack take-up and force cushioning means that modifies the action of the associated servo mechanism.

It is another object of this invention to provide control valving for a fluid operated servo mechanism that will automatically insure gradual application of the force exerted by the servo mechanism.

It is a further object of this invention to provide control valving for a fluid operated servo mechanism that causes a more or less step-by-step increase in the application of the force exerted by the servo mechanism.

It is a still further object of this invention to provide a fluid operated servo mechanism having relatively movable piston elements mounted therein and arranged such that the force applied to the piston elements is transmitted in a predetermined manner.

It is a still further object of this invention to provide a fluid operated servo mechanism with contained valving adapted to provide an improved means for taking up slack in a band device operated by the servo mechanism.

Other objects and advantages of the disclosed invention will be readily apparent from a reading of the attached description and a consideration of the related drawing wherein:

Fig. 1 is a fragmentary sectional elevational view of a band-type brake device operated by a servo mechanism that embodies one form of this invention;

Fig. 2 is an enlarged sectional view of the servo mechanism shown in Fig. 1, the view being taken along the line 2—2 of Fig. 1;

Fig. 3 is an enlarged sectional elevational view similar to Fig. 2 but showing the servo mechanism after pressurized fluid has been admitted to the piston receiving bore to effect application of the associated brake band;

Fig. 4 is a sectional elevational view taken along the line 4—4 of Fig. 2; and

Fig. 5 is a sectional elevational view, similar to Fig. 2, of a modified form of the invention.

Fig. 1 of the drawing shows a rotatable brake drum 10 having an axially extending peripheral flange 11 that is adapted to be selectively engaged by a band-type brake element 12. The band-type brake element 12 preferably has its inner surface covered with a friction lining 13 that is normally spaced radially outwardly from the drum flange 11. Band element 12 substantially encircles the drum flange 11 and has an anchor element 14 fixed to the outer surface of one end thereof. Anchor element 14 is formed to receive and abut against one end of an adjustable anchor bolt 15. Bolt 15 is threadably mounted in a boss portion 16 of the relatively stationary housing 17. Anchor bolt 15 is provided with a slotted head 18 to provide for ready adjustment of the bolt 15 in the boss 16. A lock nut 19 is threaded on the bolt 15 and arranged for engagement with the outer end of boss 16 so as to provide a means for maintaining the selected adjustment of the bolt 15.

The other end of the band type brake element 12 is provided with a yoke element 21 adapted to receive and support a pivot pin 22. Pivot pin 22 pivotally connects the thrust link 23 to the yoke 21 that is fixed on the aforementioned other end of the band 12.

Housing 17 is also provided with an ear-like projection 25 that journals a pivot pin 26. Pivot pin 26 pivotally connects a thrust lever 27 to the housing 17. Thrust lever 27 has a notch 28 formed in an edge thereof adapted to seat the free end of the thrust link 23.

Housing 17 is also formed with an integral piston receiving cylinder 31. It is obvious that the cylinder 31 could be a separable element that could be detachably connected to the housing 17. Cylinder 31 includes the stepped bore 32 that slidably receives the piston assembly 33. Pressurized fluid is admitted to cylinder bore 32 from a supply conduit 35 through an inlet port 36 in the head or closed end of cylinder 31. Pressurized fluid in cylinder bore 32 tends to move the piston assembly 33 downwardly. Piston assembly 33 includes a finger-like projection 37 on its lower side that engages the flanged free end 38 of the thrust lever 27.

It is thought to be obvious that admission of pressure fluid to bore 32 of cylinder 31 will cause piston assembly 33 to move downwardly and swing thrust lever 27 in a clockwise direction about its pivot pin 26. Movement of thrust lever 27 clockwise will contract band 12 about drum flange 11 and provide a braking action on the drum 10. On release of the pressurized fluid in cylinder bore 32 the compression spring element 39, that is mounted in the lower open side of piston bore 32, will move the piston assembly 33 upwardly to relieve the brake applying force. The inherent resilience of the band 12 will expand the band 12 out of engagement with the drum flange 11 when the brake applying force is relieved. Positive acting compression spring means 41 may be placed between the opposed ends 14, 21 of the band element 12 to insure quick release of the band 12 from drum 11 when the fluid generated brake applying force is relieved.

The invention disclosed herein relates to the servo cylinder 31 and the piston assembly 33 reciprocably mounted in the cylinder 31. It has long been a problem as to how to effectively and economically take up the clearance or slack during the engagement of a brake mechanism of the type disclosed and at the same time provide a cushioned engagement of the band and drum that will prevent grab or jerkiness during brake engagement. If the full effect of the actuating pressure fluid in bore 32 is applied to the band actuating piston assembly 33, as in conventional servo mechanisms, it is obvious that the piston 33 initially begins to move downwardly at a relatively fast rate due to the initial movement merely taking up the slack and overcoming the resistance of the spring 39. After taking up the slack or clearance between the band and drum, the full effect of the pressurized applying fluid is suddenly applied to the rotating drum and as a result a grabbing and jerky engagement results. The degree of this rough engagement of the brake band will vary with the magnitude of the reaction forces that must be taken by the brake band 12 and its supporting housing 17. If this brake band is utilized to control a planetary gear train of a motor vehicle power transmission unit then at times the gearing controlled by the band may require the band to transmit a brake reaction of 2 or 3 to 1 and under such conditions the grabbing and jerkiness described above may be quite objectionable to say the least. The several forms of servo mechanisms herein disclosed provide effective means for readily taking up the clearance between the brake band and brake drum and at the same time provide means for obtaining a cushioned engaging action.

In the form of the invention shown particularly in Figs. 2 and 3, the head or closed end 40 of the cylinder 31 has a stud-like element 44 projecting axially inwardly from the inner surface thereof. The stud element 44 may be of stepped formation having a base portion 44a of a relatively large size and a rib-like stem portion 44b of a relatively small size.

Reciprocably mounted within the bore 32 of cylinder 31 is the piston assembly 33. Piston assembly 33 comprises a pair of telescopically arranged, male and female piston elements 46 and 47 respectively. Male piston element 46 is of a T-shaped cross sectional configuration having a head portion 51 and an integral stem portion 52. The peripheral edge of the head portion 51 is provided with a sealing ring 53 that slidably engages the side wall 32a of the cylinder bore 32. The stem portion 52 of the piston element 46 is pierced by an axially extending bore 54 that also extends through the head portion 51 so as to directly connect the cylinder bore 32 to the piston bore 54. The end of bore 54 adjacent the piston head 51 is provided with an interiorly disposed, stepped, valve seat 55 that is adapted to be sealingly engaged by a ball valve 56. A spring 57, fixedly mounted in the bore 54 by means of pin 58, continuously urges the ball valve 56 on the seat 55. When seated the ball valve 56 projects outwardly beyond the end of projection 60 by the amount e (see Fig. 3). It is thought to be obvious that the valve 56 provides a one-way valve that permits pressurized fluid to be transferred from bore 32 to bore 54 while preventing the flow of fluid in the opposite direction.

Telescopically mounted about the stem portion 52 of the piston element 46 is the cup-shaped piston element 47. The bore 61 in the piston element 47 slidably receives the stem 52 of piston 46 with a minimum of clearance therebetween. The head or bottom 62 of the piston element 47 carries the finger 37 that engages the thrust lever 27 of the brake band actuating linkage previously described. The side wall 63 of the cup-shaped piston 47 is pierced by a pair of relatively small size ports or bores 64 and 65 respectively. The bores 64 and 65 are adjacent to but spaced axially from the piston head portion 62 at different distances as indicated at c and d in Fig. 3. The bores 64 and 65 are preferably of different diameters and in the construction shown the bore 64 is larger than the bore 65. The spacing of the bores 64 and 65 and their relative sizes has a material effect on the operation of this servo mechanism as will hereinafter becomes quite evident.

Operation of the servo mechanism shown in Figs. 1–3 is as follows: When pressurized fluid is not being directed into the bore 32 of cylinder 31 then spring 39 will move the piston element 46 to the released position shown in Figs. 1 and 2. The resilience of the band 12 and the action of the band release spring 41 will seat the piston element 47 on the step 59 in the stem 52 of piston element 46 when pressurized fluid is not being applied to the cylinder bore 32. When spring 39 has moved the piston 46 to the released position shown in Fig. 2, then the outwardly projecting, axially extending, seat portion 60 on the head 51 of piston element 46 will engage and seat upon the stem portion 44b of the cylinder mounted stud 44. When the cylinder head stem 44b moves into engagement with the seat portion 60 of the piston element 46, stem portion 44b of the cylinder head 40 also engages the ball valve 56 and depresses the ball 56 off its seat 55. Ball 56 is unseated on engagement of the piston portion 60 with the cylinder portion 44b due to the ball 56 normally projecting beyond the end of porjection 60 (see Fig. 3). Thus when the piston element 46 is seated on the cylinder head stud 44 there is an open passage or conduit connection between the cylinder bore 32 and the piston bore 54 that will permit the free flow of fluid between the cylinder bore 32 and the piston bore 54. It will be noted that only a slight amount of axial movement of the piston 46 away from cylinder head 40 is required to seat the valve 56. Rib 44b of the stud 44 is arranged such that it engages both the ball valve 56 and the piston projection 60 when the piston 46 is moved to its released position (see Fig. 1), thus the slightest axial movement of piston 46 begins the seating of the valve 56.

When pressurized fluid is first admitted to the cylinder bore 32 to initiate application of the brake band 12 to the drum 10, the pressurized fluid passes through the bore 32 and fills piston bore 54 due to the unseated ball valve 56. After filling bore 54 the pressurized fluid therein causes relative expansion of the telescopically arranged piston elements 46, 47 such that the piston element 47 moves downwardly away from the piston element 46. There is an initial downward movement of the piston element 47, prior to any movement of the piston element 46 due to the fact that the relatively stiff spring 39 tends to hold the piston element 46 seated on the cylinder stud 44. During this initial movement of piston 47 relative to piston 46, the valve 56 is unseated due to the piston 46 being held stationary against the rib 44b. As the piston element 47 moves downwardly relative to the piston element 46, it initiates actuation of the brake band supplying linkage 27, 23 and takes up the slack or clearance between the band 12 and drum 10. After the band slack has been taken up pressure fluid in the bore 54 and chamber 70 between piston elements 46 and 47 (see Fig. 3) begins to exert a force on the band 12 that then begins to apply the band 12 to the drum 10. It will be noted that during movement of the piston element 47 from the released position shown in Fig. 2 to the position shown in Fig. 3, wherein all slack or clearance between the band 12 and drum 10 has been taken up, that the bleed bores 64 and 65 in the wall 63 of piston 47 have both been uncovered. Uncovering bleed bores 64 and 65 permits the pressurized fluid trapped in the chamber 70 and piston bore 54 to escape at a controlled rate and to return to the fluid supply sump (not shown). Once the band slack has been taken up by the downward movement of piston 47, then the downward movement of the piston element 47 is retarded, due to the increased reaction resulting from the beginning of application of the band 12 to the drum 10, and thereafter the piston element 46 will begin to move off its seat 44b on the head of the cylinder 31 and telescope within the piston element 47. Movement of piston element 46 off its seat 44b will begin closing of the valve 56. As previously pointed out only a very small axial movement, distance e of Fig. 3, is required to seat the valve 56. After valve 56 seats then the pressure fluid trapped in piston bore 54 and chamber 70 has its pressure progressively increased with the succeeding telescopic compression of the piston elements 46, 47. When valve 56 first closes both bleed bores 64 and 65 are uncovered due to the previous expansion of piston element 47 relative to piston element 46. Accordingly, the force transmitted to the piston element 47 by initial downward movement of the piston element 46 is cushioned somewhat by the escape from bleed bores 64 and 65 of the pressure fluid trapped in chamber 70. With subsequent continued movement of the piston element 46 downwardly relative to the element 47, the relatively large bleed bore 64 is closed off and thereafter the pressure of the fluid trapped in bore 54 and chamber 70 materially increases so that the band 12 is applied to drum 10 with an increased force. Continued movement of the piston element 46 downwardly relative to the piston element 47 will increase the pressure of the fluid trapped in chamber 70 and will subsequently close off the relatively small bleed bore 65. Thereafter the pistons 46 and 47 act as substantially a single rigid unit and the full effect of the pressure fluid in chamber 32 acting on the head 52 of the piston 46 is directly applied to the brake band actuating linkage. What little pressurized fluid that is trapped in the chamber 70 after closing of bleed bore 65 eventually drains back to the fluid supply sump (not shown) through the clearance 61 between the slidably engaged sides of the telescopic pistons 46 and 47.

From the above description it is thought to be obvious that there are about four successive steps in the application of the force exerted by the servo mechanism on the associated brake band 12. First there is the slack or clearance take-up step when the valve 56 is open and pressure fluid admitted to bore 54 causes the pistons 46, 47 to expand relative to one another. Next there is the step when the piston 46 moves off its seat 44b and closes valve 56 to begin the telescopic contraction of the piston elements 46 and 47. At this time both bleed bores 64 and 65 are effective to control the force build-up applied to lever 27. Next there is the step when large bleed bore 64 has been closed off and small bleed bore 65 alone is effective to control the force build-up in the servo mechanism. Finally there is the concluding step when both bleed bores 64 and 65 have been closed off and the full effect of the pressure fluid in cylinder bore 32 is effective to apply the brake band 12. While the four pressure variation effects have been described as definite steps for the sake of clarity, it is to be realized that the band applying action occurs very rapidly and that there is a blending or graduation of one step into the next step so that a very smooth continuous slack take-up and band engaging action results. By control of the spacing and size of the bleed bores 64, 65 it is possible to vary the operating characteristic of the servo mechanism to meet certain predetermined conditions. The operation of the servo mechanism described has been predicated on the fact that a more or less limited supply of pressure fluid is directed into cylinder bore 32. This supply may be limited by a restriction 75 in the pressure fluid supply line 36.

Fig. 5 shows a modified form of the invention that is quite similar to the form shown in Figs. 1–4. The Fig. 5 form differs from the Fig. 1–4 form only in the construction of the inner surface 49a of the head 40 of cylinder 31 and in the construction of the head end 51' of the piston element 46. All other elements of the two forms of the invention are identical and like reference numerals have been assigned to identical elements. The exposed outer side 81 of the head 51' of piston 46 in the Fig. 5 construction is formed with an annular groove 82 that receives a resilient sealing ring 83. Ring 83 may be of rubber or some similar material. Head 51' is also provided with an annular, axially extending flange 84 that abuts the outer peripheral side of the groove 82 and the resilient ring 83. Flange 84 supports the ring 83 and prevents its expansion radially outwardly when pressurized fluid is admitted to the cylinder bore 32. A number of bleed bores 85 pierce the piston head 51' and connect the inner end of the ring receiving groove 82 to the sump or drain side of the servo mechanism. Bleed bores 85 relieve the pressure on the inner end edge of the sealing ring 83 and tend to retain the ring 83 in the groove 82. With the Fig. 5 form of the invention, it is obvious that when the piston 46 is in its released position, as shown, that only the area of piston head 51' that is encircled by the ring 83, is acted on by the pressure fluid admitted to the cylinder bore 32. Thus ring 83 provides a means for controlling the force applied to the piston 46 when the piston 46 is in its released position. This means for controlling the force on the piston 46 in its released position is important in that it provides a means for varying the slack take-up operating characteristics of the servo mechanism with changes in diameter of the ring 83. Obviously after piston 46 starts to move away from the seat 44 then the seal between ring 83 and cylinder head surface 49a is broken and then the entire area of the head 51' of piston 46 is acted on by the pressurized fluid admitted to cylinder bore 32 to bring about the aforementioned cushioned engagement of the brake band 12 with the drum 10.

I claim:

1. A pressure fluid operated servo mechanism comprising a cylinder with a bore therein, a pair of relatively movable pistons reciprocably mounted in said cylinder bore, a pressure fluid inlet to said cylinder bore arranged to introduce pressurized servo energizing fluid to said cylinder bore to successively effect relative and conjoint movement of said pistons, valve means carried by one of said pistons and controlled by the positioning of said one of said pistons in one of its limiting positions in said cylinder bore to control the application of said pressurized servo energizing fluid to the other of said pistons to effect relative movement between said pistons, and pressure fluid bleed porting in one of said pistons and controlled by the relative movement between said pistons to bleed the pressurized servo energizing fluid from said servo mechanism to provide means to cushion the force transmitted by the energization of the pistons of said servo mechanism.

2. A pressure fluid operated servo mechanism comprising a cylinder with a bore therein, a pair of relatively movable pistons reciprocably mounted in said cylinder bore, a pressure fluid inlet to said cylinder bore arranged to introduce pressurized servo energizing fluid to said cylinder bore to effect relative and conjoint movement of said pistons, valve means operated by the positioning of at least one of said pistons in one of its limiting positions in said cylinder bore to control the application of said pressurized servo energizing fluid to the other of said pistons to effect relative movement between said pistons, pressure fluid bleed porting connected with said pistons and controlled by the relative movement between said pistons to bleed the pressurized servo energizing fluid from said servo mechanism to provide means to cushion the force transmitted by the actuation of the pistons of said servo mechanism, and resilient means arranged to resist movement of said pistons by pressurized fluid introduced to said cylinder bore.

3. A servo mechanism comprising a cylinder with a bore therein, a pair of telescopically arranged pistons reciprocably mounted in said cylinder bore, a pressure fluid inlet to said cylinder bore arranged to apply pressurized servo energizing fluid to at least one of said pistons to successively effect relative and conjoint movement of said pistons, a valve controlled conduit means carried by one of said piston means and operated by movement of said one of said pistons to and from its limiting positions adapted to provide for controlled transfer of pressurized servo energizing fluid from said cylinder bore to a chamber formed interiorly of said telescopically arranged pistons from opposed portions of said pistons, admission of pressurized servo energizing fluid to said chamber being effective to cause relative movement between said pistons, pressure fluid bleed porting associated with interengaged, relatively movable portions of said pistons to bleed pressurized servo energizing fluid from said chamber so as to cushion the effect of the force transmitted by the pistons of said servo mechanism, and resilient means resisting conjoint movement of said pistons.

4. A servo mechanism comprising a cylinder with a bore therein, a pair of telescopically arranged pistons reciprocably mounted in said cylinder bore, a pressure fluid inlet to said cylinder bore arranged to apply pressurized fluid to at least one of said pistons to effect conjoint movement thereof, a valve controlled conduit means carried by one of said piston means adapted to provide for controlled transfer of pressurized fluid from said cylinder bore to a chamber formed interiorly of said telescopically arranged pistons from opposed portions of said pistons, admission of pressurized fluid to said chamber being effective to cause relative movement between said pistons, a plurality of pressure fluid bleed ports in the walls of said chamber to provide for controlled escape of the pressurized fluid introduced to said chamber, said bleed ports being spaced apart axially of said telescopically arranged pistons and being of varying sizes, and resilient means resisting conjoint and relative movement of said pistons.

5. A servo mechanism comprising a cylinder with a bore therein, a pair of telescopically arranged large and small pistons reciprocably mounted in said cylinder bore, a pressure fluid inlet to said cylinder bore arranged to apply pressurized servo energizing fluid to said pistons to successively effect relative and conjoint movement of the pistons, a valve controlled conduit means carried by the larger of said pistons and operated by movement of the larger of said pistons to and from one of its limiting positions adapted to provide for controlled transfer of pressurized servo energizing fluid from said cylinder bore to a chamber formed interiorly of said telescopically arranged pistons from opposed portions of said pistons, admission of pressurized servo energizing fluid to said chamber being effective to cause relative movement between said pistons, pressure fluid bleed porting formed in interengaged, relatively movable portions of said pistons to bleed pressurized fluid from said chamber on relative movement between the pistons so as to cushion the effect of the force transmitted by the pistons of said servo mechanism, resilient means resisting conjoint and relative movement of said pistons, and mechanism engageable with and actuable by the smaller piston of said servo mechanism.

6. A pressure fluid operated servo mechanism comprising a cylinder with a bore therein, a pair of pistons reciprocably mounted in said cylinder bore for conjoint and relative movement therein, a pressure fluid inlet to said cylinder bore arranged to apply pressurized servo energizing fluid to one of said pistons to urge said one piston in one direction, resilient means resisting movement of said one piston by the pressurized fluid admitted to said cylinder bore, conduit means arranged to apply the pressurized servo energizing fluid in said cylinder bore to a chamber formed by opposed portions of said pistons to effect movement of the other piston in said one direction when said one piston is in one of its limiting positions, valves means operated by the movement of said one piston from said limiting position in said one direction to prevent the passage of the pressurized servo energizing fluid from the cylinder bore through said conduit means to the said chamber, pressure fluid bleed porting in the other of said pistons controlled by the relative movement between said pistons to cushion the effect of the pressure fluid introduced to said cylinder bore and to said chamber, and means resisting movement of said other piston in said one direction.

7. A pressure fluid operated servo mechanism comprising a cylinder with a bore therein, a first piston of substantially T-shaped cross sectional configuration having the head portion thereof reciprocably mounted in said cylinder bore and the stem portion extending axially of the cylinder bore, a pressure fluid inlet to said cylinder bore arranged to apply pressurized fluid to the head portion of said first piston to effect movement of said first piston in one direction in said cylinder bore, resilient means resisting movement of said first piston in said one direction, a second piston of substantially U-shaped cross sectional configuration having the side wall portions thereof telescopically mounted on the stem portion of said first piston and arranged to provide a pressure fluid receiving chamber of variable capacity between the free end of the stem portion of the first piston and the closed end of the second piston, a bore through the stem and head of said first piston connecting the pressure fluid receiving portion of the cylinder bore to said chamber, a valve mounted in said bore to control passage of pressurized fluid from said cylinder bore to said chamber, abutment means in said cylinder bore to open said valve when said cylinder bore is free of pressurized fluid, resilient means continuously urging said valve closed, and resilient means opposing movement of said second piston in said one direction.

8. A pressure fluid operated servo mechanism comprising a cylinder with a bore therein, a first piston of substantially T-shaped cross sectional configuration having the head portion thereof reciprocably mounted in said cylinder bore and the stem portion extending axially of the cylinder bore, a pressure fluid inlet to said cylinder bore arranged to apply pressurized fluid to the head portion of said first piston to effect movement of said first piston in one direction in said cylinder bore, resilient means resisting movement of said first piston in said one direction, a second piston of substantially U-shaped cross sectional configuration having the side wall portions thereof telescopically mounted on the stem portion of said first piston and arranged to provide a pressure fluid receiving chamber of variable capacity between the free end of the stem portion of the first piston and the closed end of the second piston, a bore through the stem and head of said first piston connecting the pressure fluid receiving portion of the cylinder bore to said chamber, a valve mounted in said bore to control passage of pressurized fluid from said cylinder bore to said chamber, abutment means in said cylinder bore to open said valve when said cylinder bore is free of pressurized fluid, resilient means continuously urging said valve closed, pressure fluid bleed porting piercing the side walls of said second piston and connectible to said chamber to provide a means to bleed pressurized fluid from said chamber during certain relative positions of said pistons, and resilient means opposing movement of said second piston in said one direction.

9. A pressure fluid operated servo mechanism comprising a cylinder with a bore therein, a first piston of substantially T-shaped cross sectional configuration having the head portion thereof reciprocably mounted in said cylinder bore and the stem portion extending axially of the cylinder bore, a pressure fluid inlet to said cylinder bore arranged to apply pressurized fluid to the head portion of said first piston to effect movement of said first piston in one direction in said cylinder bore, resilient means resisting movement of said first piston in said one direction, a second piston of substantially U-shaped cross sectional configuration having the side wall portions thereof telescopically mounted on the stem portion of said first piston and arranged to provide a pressure fluid receiving chamber of variable capacity between the free end of the stem portion of the first piston and the closed end of the second piston, a bore through the stem and head of said first piston connecting the pressure fluid receiving portion of the cylinder bore to said chamber, a valve mounted in said bore to control passage of pressurized fluid from said cylinder bore to said chamber, abutment means in said cylinder bore to open said valve when said cylinder bore is free of pressurized fluid, resilient means continuously urging said valve closed, a plurality of pressure fluid bleed ports in the side wall portion of said second piston, said bleed ports being spaced apart axially of the second piston and being of varying sizes with the size of the bores increasing from the closed end of the second piston towards the open end thereof, said bleed bores being connectible to said chamber at predetermined relative positions of said pistons, and resilient means opposing movement of said second piston in said one direction.

10. A servo mechanism of the type described in claim 9 wherein the effective area of the head portion of the first piston is equal to the area of the cylinder bore and the effective area of the closed end of the second piston is considerably smaller than the area of the cylinder bore.

11. A servo mechanism of the type described in claim 9 wherein the head portion of the first piston includes an axially extending, annular projection arranged concentrically within the cylinder bore, said projection being adapted to seal against a wall of the cylinder when the first piston is in a released position to provide a reduced area to which is initially applied the piston actuating pressurized fluid.

12. A servo mechanism of the type described in claim 9 wherein the entire area of the head portion of the first piston is always effective to transmit the force of the pressurized fluid admitted to the cylinder bore.

13. A servo mechanism adapted to apply a band type brake element to a rotatable drum member comprising a cylinder with a closed end bore, a pressure fluid inlet through the closed end of the cylinder, a first piston including a head portion reciprocably mounted in said bore, said head portion having an axially extending stem portion projecting from the underside thereof, an axially extending bore piercing said stem and head portions of said first piston, a valve member resiliently mounted in said bore having portions normally projecting axially outwardly of said head portion of the first piston and adapted to be engaged with the closed end of the cylinder bore, a second piston telescopically mounted on the free end of the stem portion of the first piston, said second piston having a closed head portion adjacent the free end of the stem portion of the first piston and side wall portions surrounding said stem portion, said side wall portions being pierced by openings of different sizes that are spaced axially from the closed end of said second piston at variable intervals, and resilient means resisting movement of the pistons by admission of pressure fluid to the cylinder bore.

WILLIAM L. SHEPPARD.

REFERENCES CITED

The following references are of record in the file of this patent:

UNITED STATES PATENTS

| Number | Name | Date |
|---|---|---|
| 1,970,999 | Ferris et al. | Aug. 21, 1934 |
| 2,170,851 | Carroll | Aug. 29, 1939 |
| 2,453,785 | Cousino | Nov. 16, 1948 |
| 2,513,192 | McFarland | June 27, 1950 |

FOREIGN PATENTS

| Number | Country | Date |
|---|---|---|
| 521,980 | Great Britain | June 5, 1940 |